United States Patent [19]

Chow

[11] Patent Number: 5,130,352
[45] Date of Patent: Jul. 14, 1992

[54] SUPPRESSION OF DEGRADATION OF LIGNOCELLULOSE/POLYETHYLENE COMPOSITIONS

[75] Inventor: Suezone Chow, Richmond, Canada

[73] Assignee: Canadian Forest Products Ltd., Vancouver, Canada

[21] Appl. No.: 700,989

[22] Filed: May 16, 1991

[30] Foreign Application Priority Data

May 21, 1990 [GB] United Kingdom ............... 90.11363

[51] Int. Cl.⁵ .................. C08L 97/02; C08K 3/38
[52] U.S. Cl. .................................. 524/13; 524/16; 524/35; 524/40; 524/404; 524/405
[58] Field of Search ............... 524/13, 15, 16, 35, 524/40, 404, 405, 409

[56] References Cited

U.S. PATENT DOCUMENTS 3,321,421  5/1967  Pataki et al. .................. 524/13
3,816,307  6/1974  Woods ............................ 524/409

FOREIGN PATENT DOCUMENTS 0055367  5/1978  Japan ............................. 524/405
0105433  6/1982  Japan ............................. 524/15

*Primary Examiner*—Paul R. Michl
*Assistant Examiner*—Peter Szekely
*Attorney, Agent, or Firm*—Richard H. Burgess

[57] ABSTRACT

Mouldable filled polyethylene compositions containing particulate lignocellulosic fillers are disclosed. The compositions contain 0–89.97% (by weight of the composition) of polyethylene, 0.01–89.99% (by weight of the composition) of grafted polymer, 10–60% (by weight of the composition) of particulate lignocellulosic material and 0.02–20% (by weight of the composition) of boric acid and/or borax. The boric acid and/or borax is added to suppress odor during manufacture and processing of the compositions. The compositions may be formed into moulded articles e.g. containers and the like.

5 Claims, No Drawings

SUPPRESSION OF DEGRADATION OF LIGNOCELLULOSE/POLYETHYLENE COMPOSITIONS

The present invention relates to mouldable filled polyethylene compositions in which the filler is a particulate lignocellulosic material, and especially to such compositions which contain boron compounds for suppression of colour-darkening and formation of odour related to thermal degradation of these fillers.

The forest industry uses substantial quantities of lignocellulosic materials in processes for the preparation of products. Examples of the latter include pulp for the manufacture of paper and related products and lumber for the construction industry. In such processes, a high proportion of second grade, scrap or other cellulosic waste material may be formed. Such material may include waste paper, sawdust, chips, shavings and the like, and may be readily comminuted into smaller particulate lignocellulosic material.

When lignocellulosic wood material is heated, breakdown of chemical bonds begins at about 175° C., with the reaction accelerating with increasing temperature. Overall thermal degradation of wood may be considered as the sum of the degradation of its components. Major thermal rearrangements occur at about 200° C. for hemicelluloses while lignin and cellulose start to show substantial degradation effects at about 230°–250° C. Species anatomy and chemical variations, moisture content, and heating history all can alter the initiation temperature of these degradation reactions. Changes occurring during wood degradation include chemical oxidation reactions, hydrolysis of functional groups resulting in vapour release, and reduction in the degree of polymerization of cellulose chains. Physical characteristics of thermal degradation often include a darkening in colour and presence of a strong odour of smoldering wood.

Filled polyethylene compositions are useful in a number of end-uses, especially as moulded or other formed products. The filler may be used to impart particular properties to the polyethylene e.g. stiffness, or merely be used to reduce the effective cost of the polymer.

The use of cellulosic fillers is known. For example U.S. Pat. No. 3,485,777 of N.G. Gaylord, which issued Dec. 23, 1969, relates to the compatibilization of normally incompatible polymers, one polymer being a highly hydrogen bonded polyhydric polymer e.g. cellulosic material, with the other being a thermoplastic polymer e.g. polyethylene. U.S. Pat. No. 3,649,939, of N.G. Gaylord, which issued Feb. 29, 1972, also relates to the compatibilization of hydroxyl containing materials e.g. cellulose, with thermoplastic materials containing labile atoms e.g. polyethylene. Cellulosic fillers heat treated with glyoxal and which are intended for use in thermoplastic polymers are disclosed in U.S. Pat. No. 4,783,493 of T. Motegi et al., which issued 1988 Nov. 08.

U.S. Pat. No. 3,632,514 of C.J. Blocher, which issued Jan. 04, 1972, discloses the use of quaternary ammonium compounds to reduce the odour of sawdust materials intended to be spread as a covering on the floors of meat, fish and poultry processing plants. U.S. Pat. No. 4,833,181 of K. Narakawa et al, which issued May 23, 1989, discloses compositions of polyolefin, vegetable fibres and a deodorizer selected from activated carbon, zeolite, a phosphorus compound and a mixture of metallic soap and an amine antioxidant.

Compositions of polyethylene and cellulosic materials tend to exhibit odours characteristic of thermal degradation if subjected to forming processes at elevated temperatures. For example, injection moulded or thermoformed products formed from the compositions have a smoldering wood-like odour, which tends to be more pronounced at higher processing temperatures. However, there are limits to the potential reduction of such temperatures that are primarily dictated by the need to process the compositions under melt processing conditions. Smoldering wood-like odour and/or colour darkening impose substantial restrictions on the available end-uses for the products.

Studies of the surface of wood during drying at elevated temperatures have shown that as thermal degradation occurs, colour intensity develops which is related to various chromophores present in the wood. The increase in colour is initially due to increased oxidation reactions affecting both carbohydrates and lignins. Reduction of colour development may be achieved by pretreatment of the wood surface with chemicals that protect the surface from oxidation, but all so-called fire retardant chemicals are not necessarily candidates for suppressing odour and colour development. Fire retardant treatment of wood is based on the principle of chemically altering the pyrolysis mechanism of wood by increasing the amount of char and reducing the amount of volatile, combustible vapours through lowering the temperature at which the thermal degradation begins. This mechanism suggests that many fire retardant chemicals would be unsuitable for suppression of odour and colour effects of degradation in filled polyethylene compositions.

Mouldable filled polyethylene compositions formed from polyethylene and lignocellulosic materials and which contain boron compounds to suppress odour in moulded products obtained therefrom have now been found.

Accordingly, the present invention provides a mouldable filled composition consisting essentially of:

(a) a polyethylene component comprising (i) 0–89.97%, by weight of the composition, of a homopolymer of ethylene or a copolymer of ethylene and at least one $C_4$–$C_{10}$ hydrocarbon alpha-olefin, or a mixture thereof, said homopolymer or copolymer having a density in the range of 0.89 to 0.97 g/cm$^3$ and a melt index in the range of 0.30 to 120 dg/min., and (ii) 0.01–89.98%, by weight of the composition, of a grafted polyethylene obtained by the grafting of a homopolymer of ethylene or copolymer of ethylene and at least one $C_4$–$C_{10}$ hydrocarbon alpha-olefin with a grafting monomer that is at least one of an ethylenically unsaturated aliphatic carboxylic acid or ethylenically unsaturated aliphatic carboxylic acid anhydride, said grafted polyethylene containing at least 0.01% of the grafting monomer;

(b) 10–60%, by weight of the composition, of a particulate lignocellulosic material; and (c) 0.02–20%, by weight of the lignocellulosic material, of a boron compound selected from the group consisting of boric acid and borax, and mixtures thereof.

In a preferred embodiment of the composition of the present invention, the grafting monomer is maleic acid or maleic anhydride.

The present invention relates to a composition having a polyethylene component, a cellulosic material and a boron compound. The polyethylene component contains grafted polyethylene and will normally contain an un-grafted polyethylene. The un-grafted polyethylene may be a homopolymer of ethylene or a copolymer of ethylene with at least one $C_4$–$C_{10}$ hydrocarbon alpha-olefin, or mixtures thereof. The preferred copolymers are copolymers of ethylene with butene-1, hexene-1 and/or octene-1. The density of the polymers may be varied over a wide range e.g. in the range of from about 0.890 g/cm$^3$ to about 0.970 g/cm$^3$, and especially in the range of 0.920 to 0.960 g/cm$^3$. The melt index of the polymer, as measured by the procedure of ASTM D-1238 (Condition E, also known as 190/2.16) is preferably in the range of 0.30 to 120 dg/min, and especially in the range of 0.75 to 100 dg/min.

The polyethylene of the grafted polyethylene may be a homopolymer of ethylene or a copolymer of ethylene with at least one $C_4$–$C_{10}$ hydrocarbon alpha-olefin, or mixtures thereof. The preferred copolymers are copolymers of ethylene with butene-1, hexene-1 and/or octene-1. The density of the polymers may be varied over a wide range e.g. in the range of from about 0.890 g/cm$^3$ to about 0.970 g/cm$^3$, and especially in the range of 0.910 to 0.960 g/cm$^3$. The melt index of the polymer is preferably in the range of 0.30 to 120 dg/min, and especially in the range of 0.75 to 100 dg/min. The polyethylene of the un-grafted polyethylene and of the grafted polyethylene may be the same or different.

The monomer that is grafted onto the polyethylene is an ethylenically unsaturated aliphatic carboxylic acid or derivative thereof. The grafting monomer is selected from the group consisting of ethylenically unsaturated aliphatic carboxylic acids and ethylenically unsaturated aliphatic carboxylic acid anhydrides, including derivatives of such acids. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride, nadic anhydride, nadic methyl anhydride and tetrahydro phthalic anhydride. Examples of derivatives of the unsaturated acids are salts, amides, imides and esters e.g. mono- and disodium maleate, acrylamide, maleimide, glycidyl methacrylate and diethyl fumarate. The preferred monomer is maleic acid or maleic anhydride.

The amount of grafted monomer on the grafted polyethylene may be varied over a wide range, but should be at least 9 ppm by weight of the polyethylene. In embodiments, the amount of grafted monomer may be as high as 5% by weight, especially 0.01–0.2% by weight and in particular in the range of 0.02–0.15% by weight. Grafted polyolefins are available commercially e.g. under the trademark Fusabond from Du Pont Canada Inc. In addition, methods for the grafting of monomers onto polyolefins are disclosed in U.S. Pat. No. 4,612,155 of R.A. Zelonka and C.S. Wong, issued Sep. 16, 1986. The amount of grafted monomer in the polyethylene used according to the present invention may be obtained by grafting the required amount onto the polyethylene or by blending a polymer having a higher level of graft monomer with un-grafted polyethylene or polyethylene with a lower level of graft monomer. In alternative embodiments, the grafted polyethylene may be replaced with an acid copolymer e.g. a copolymer of ethylene and an unsaturated carboxylic acid, examples of which are ethylene/acrylic acid and ethylene/methacrylic acid copolymers, or with ionomers of such copolymers. Examples of both the acid copolymers and ionomers are commercially available.

The polyethylene (also referred to herein as un-grafted polyethylene) is used in an amount of 0 to 89.97% by weight of the composition, especially 25 to 75% by weight of the composition. Similarly, the grafted polyethylene is used in an amount of 0.01 to 89.98% by weight of the composition, especially 1 to 20% by weight of the composition.

The lignocellulosic material (sometimes referred to herein as cellulosic material) may be obtained from a variety of sources. For instance, the cellulosic substrate may have been derived from particles, chips, flakes, sawdust, paper (including recycled paper) and/or other fragments of wood. Moreover, the fragments of wood may be derived from a variety of trees, including both hardwood and softwood trees. Examples of such trees include, but are not limited to, aspen, beech, birch, cedar, Douglas and other firs, hemlock, pine and spruce in Canada, but in other countries could be exemplified by other types of trees. It is to be understood that the cellulosic material may be recycled material e.g. recycled paper i.e. paper in the form of newspapers, magazines and other communications or scrap paper or the like that has been recovered for re-use.

The cellulosic material is in a comminuted form, and it may be necessary to subject potentially useful material to a comminution process so as to obtain it in an acceptable particulate size for the proposed end-use. In preferred embodiments, the particulate size of the cellulosic material is less than 2 mm, and especially less than 1 mm. The cellulosic material is used in an amount of 10 to 60% by weight of the composition, especially 20 to 40% by weight of the composition.

The compositions of the invention also contain a boron compound that is selected from boric acid and borax, or mixtures thereof. The preferred boron compound is boric acid. The boron compound is used in amount of 0.02 to 20% by weight of the cellulosic component of the filled composition, especially 0.1 to 3% and in particular 0.9 to 1.5% by weight of the cellulosic component.

In addition to the components mentioned above, the compositions may contain antioxidants, UV and other stabilizers, pigments, tougheners and other additives.

The compositions of the present invention may be prepared by feeding the components of the composition to an internal mixer or an extruder, especially an extruder adapted for the compounding of polymer compositions. All of the components may be fed in the form of a physical blend to the hopper of the mixer or extruder, or alternatively polymeric and wood/boron component may be fed to separate hoppers, or some of the polymeric components may be fed by other means into the extruder; the polymeric components are generally in the form of pellets and are dry blended together prior to being fed to the extruder or mixer, and the boron compound is preferably coated or otherwise added to the cellulosic material, rather than melt blended into the polymeric components. The mixer or extruder should be operated at temperatures above the melting point of all of the polymeric components of the composition. The composition obtained from the extruder would normally be in the form of pellets, granules or other comminuted shapes, but the composition may be fed to other processing apparatus or otherwise directly formed into a shaped article.

The compositions of the invention may be used in a variety of processes, especially moulding or thermoforming processes. For example, the compositions may be injection moulded into containers, trays, boxes and other shaped articles, or thermoformed into trays and the like, as will be appreciated by those skilled in the art.

The present invention is illustrated by the following examples:

EXAMPLE I

A composition was prepared from 65% by weight of polyethylene, 30% by weight of sanderdust and 5% by weight of grafted polyethylene. The polyethylene was an ethylene homopolymer having a density of 0.960 g/cm$^3$ and a melt index of 5.0 dg/min. The sanderdust had a particle size of less than 1.00 mm and was formed from pine, spruce and fir. The grafted polyethylene was an ethylene homopolymer having a density of 0.960 g/cm$^3$ and a melt index of 5.0 dg/min, that had been melt grafted with 0.9% of maleic anhydride, the grafted polymer having a melt index of about 2 dg/min. In separate experiments, the composition did not contain a boron compound, or contained 0.8% boric acid based on wood component (0.25% based on the composition) that had been coated in powder form onto the sanderdust.

The compositions were compounded and then injection moulded on a 90 tonne Engel TM injection moulding machine at melt temperatures of 202° C., 188° C. and 160° C.; the temperatures of the melt in the compounding step were 170° C., 170° C. and 160° C., respectively. The colour of the products moulded at each temperature from the compositions with and without boric acid was approximately the same, but the actual colour of the products was darker at the higher compounding temperature. In an odour test, a panel of five persons concluded, unanimously, that the products moulded from the compositions containing boric acid had less odour than did the products moulded from compositions not containing boric acid.

EXAMPLE II

Compositions were compounded at a temperature of 185° C. from a homopolymer of ethylene having a density of 0.96 g/cm$^3$ and a melt index of 5.0 dg/min, 30% by weight of the sanderdust of Example I and 5% by weight of the grafted polyethylene of Example I. The compositions also contained either mineral oil (1%)/stearic acid (1%) or mineral oil (1%)/stearic acid (1%)/boric acid (1%) i.e. 3.3% based on the wood component, that had been coated in powder form onto the sanderdust.

A panel of four persons concluded, unanimously, that the composition containing boric acid had a lower odour than the composition that did not contain boric acid.

EXAMPLE III

Compositions were compounded in a Brabender TM mixer at a temperature of 210° C., a rotor speed of 50 rpm and a residence time of 5 minutes, from a homopolymer of ethylene having a density of 0.96 g/cm$^3$ and a melt index of 5.0 dg/min, 30% by weight of the sanderdust of Example I and 5% by weight of a grafted polyethylene having a density of 0.95 g/cm$^3$ and a melt index of 7.0 dg/min. In separate experiments, the compositions also contained between 0.5 and 5% by weight of boric acid (1.7 and 17%, respectively, based on the wood component) that had been coated in powder form onto the sanderdust. In another experiment, 1.4% by weight of boric acid (4.7% based on the wood component) was added directly in powder form into molten polymer.

It was found that the compositions containing the lower levels of boric acid were lighter in colour, the colour changing from a brown colour in the absence of boric acid to colours with grey tones that increased in intensity with increasing amounts of boric acid. This trend in colour changes from brown to lighter brown and then to grey would indicate that the optimum level of boric acid is probably in the range of 1.7 to 17%, based on the wood component.

The composition formed by addition of boric acid to the melt had a substantially darker colour than a corresponding composition in which the boric acid was coated onto the sanderdust. This would indicate that it is preferable to premix the boric acid with the wood prior to addition of the wood to the polymer melt.

In an odour test, it was found that the compositions with boric acid levels of 2% by weight (6.7% based on wood component) or less, had the lower odour levels.

EXAMPLE IV

Aqueous solutions (0.3–6.8% w/v) of each of boric acid and borax and in admixture (1:1 w/w) were prepared using warm water with intermittent stirring. Each solution was uniformly sprayed onto separate wood powder samples made from mixtures of spruce, pine and fir (SPF) species which resulted in respective concentrations (solids content) of 1, 3, 5, 10 and 20% chemicals to wood. The pH values of the solutions are given in Table I below, and show that one solution was acid, another was basic and the third was of intermediate acidity.

After drying each sprayed sample in an oven at 100° C. until a moisture content of 10% was reached, one gram samples were placed between a sheet of release paper and a sheet of kraft paper, and pressed in a hydraulic press at either 220° C. or 250° C. for 5, 10 or 20 minutes. All tests were conducted in at least triplicate. Thermal degradation was quantified by measuring the colour darkness (percent reflectance) of the heated sample with a Minolta Chromaticity Meter TM. The results are summarized in Table I.

TABLE I

| | | Average Colour Index* | | | | | |
|---|---|---|---|---|---|---|---|
| | | Temperature = 220° C. | | | Temperature = 250° C. | | |
| Treatment | pH** | 5 min | 10 min | 20 min | 5 min | 10 min | 20 min |
| control | | 75.6 | 71.6 | 65.5 | 61.3 | 56.1 | 49.7 |
| 1% boric acid | 6.5 | 77.5 | 71.4 | 65.1 | 64.0 | 53.6 | 46.7 |
| 3% boric acid | 6.1 | 78.2 | 72.7 | 66.9 | 64.8 | 54.1 | 49.5 |
| 5% boric acid | 5.4 | 81.1 | 78.8 | 71.0 | 67.9 | 59.1 | 52.1 |
| 10% boric acid | 4.3 | 76.8 | 73.8 | 66.4 | 66.4 | 59.7 | 53.1 |

TABLE I-continued

| | | Average Colour Index* | | | | | |
|---|---|---|---|---|---|---|---|
| | | Temperature = 220° C. | | | Temperature = 250° C. | | |
| Treatment | pH** | 5 min | 10 min | 20 min | 5 min | 10 min | 20 min |
| 20% boric acid | 3.5 | 72.4 | 66.9 | 66.5 | 66.4 | 59.9 | 57.0 |
| 1% borax | 9.3 | 69.1 | 64.7 | 58.6 | 56.7 | 50.1 | 48.2 |
| 3% borax | 9.4 | 69.4 | 63.1 | 57.4 | 55.3 | 69.6 | 45.6 |
| 5% borax | 9.5 | 69.5 | 63.0 | 57.9 | 54.2 | 49.5 | 44.9 |
| 10% borax | 9.6 | 72.0 | 67.0 | 61.0 | 56.2 | 51.7 | 44.4 |
| 20% borax | 9.7 | 75.9 | 71.3 | 66.2 | 59.4 | 55.3 | 49.3 |
| 1% boric/borax(1:1) | 8.4 | 72.6 | 67.4 | 62.5 | 62.6 | 54.0 | 48.4 |
| 3% boric/borax(1:1) | 8.3 | 71.9 | 67.4 | 61.9 | 57.7 | 52.5 | 46.1 |
| 5% boric/borax(1:1) | 8.2 | 72.6 | 67.7 | 62.5 | 58.4 | 53.0 | 45.8 |
| 10% boric/borax(1:1) | 8.0 | 75.7 | 70.8 | 68.3 | 59.2 | 53.8 | 47.0 |
| 20% boric/borax(1:1) | 7.7 | 77.4 | 73.6 | 69.5 | 62.4 | 55.2 | 48.8 |

*Higher values indicate lighter colours.
**Values are for solutions measured at room temperature, except for boric acid which was at 35° C.

Increased boric acid concentration was found to decrease colour darkening at all three pressing times at the higher temperature (250° C.). At the lower temperature (220° C.), the lower boric acid concentration, especially 3-5%, gave the lightest wood colour; colour darkening increased with increase in concentration.

Borax treatment showed improvement in colour at the lower temperature, especially at higher concentration.

The 1:1 mixture of boric acid and borax was not as effective as boric acid alone in reducing colour darkening of wood. It was most effective at the lower temperature at higher concentrations.

EXAMPLE V

Aqueous solutions of magnesium sulfate ($MgSO_4$), sodium borohydride ($NaBH_4$), titanium dioxide ($TiO_2$) or a 1:1 mixture of $TiO_2$ and boric acid [$B(OH)_3$] were applied to SPF wood dust to give chemical/wood concentrations of 1% w/w, 2% w/w, 5% w/w or 10% w/w. Samples were dried and pressed for 5 minutes at 220° C. or 250° C. following the procedure used in Example IV. Colour reflectance measurements were made, as described in Example IV. The results obtained are given in Table II.

TABLE II

| | Average Colour Index* | |
|---|---|---|
| Treatment | (220° C.) | (250° C.) |
| Control | 77.0 | 60.7 |
| 1% $MgSO_4$ | 76.2 | 60.2 |
| 2% $MgSO_4$ | 76.2 | 62.3 |
| 5% $MgSO_4$ | 76.2 | 61.0 |
| 10% $MgSO_4$ | 76.0 | 58.8 |
| 2% $TiO_2$ | — | 55.2 |
| 5% $TiO_2$ | — | 57.6 |
| 10% $TiO_2$ | 68.4 | 64.0 |
| 2% (1:1 $TiO_2$/$B(OH)_3$) | — | 55.2 |
| 5% (1:1 $TiO_2$/$B(OH)_3$) | — | 57.6 |
| 10% (1:1 $TiO_2$/$B(OH)_3$) | 76.4 | 66.6 |
| 2% $NaBH_4$ | — | 56.7 |
| 5% $NaBH_4$ | — | 58.0 |
| 10% $NaBH_4$ | 66.1 | 55.1 |

*Higher values indicate lighter colours

Both $MgSO_4$ and $NaBH_4$ treatments showed little or negative effects on colour suppression. $TiO_2$ at high concentration resulted in some colour improvement but the $TiO_2$ and boric acid combination at high concentration showed most improvement in this test series.

EXAMPLE VI

SPF wood dust was treated with an aqueous boric acid solution to give 10% w/w boric acid to wood after drying. Both treated and untreated wood dust were separately compounded with polyethylene using a Cemotec TM sample mill to accomplish mixing. The ratios of polyethylene to wood dust used were 80:20 and 70:30. One gram samples of the compounded mixtures were placed on a release paper and baked in a Pyrex TM pan in an oven at 250° C. for about 45 minutes. Extent of degradation was measured as described in Example IV.

| | Average Colour Index* | |
|---|---|---|
| Treatment | PE:Wood** 80:20 | PE:Wood 70:30 |
| untreated | 33.7 | 37.6 |
| 10% boric acid | 45.4 | 44.9 |

*Higher value indicates lighter colour.
**PE:Wood is the ratio of polyethylene to wood.

The same general trend was found in these samples as was noted in the previous wood samples indicating boric acid treatment of wood at 10% w/w level improves colour lightness in heated polyethylene-wood mixtures.

EXAMPLE VII

A composition was prepared from 65% by weight of polyethylene, 30% by weight of sanderdust and 5% by weight of grafted polyethylene. The polyethylene was an ethylene homopolymer having a density of 0.960 g/cm$^3$ and a melt index of 5.0 dg/min. The sanderdust had a particle size of less than 1.00 mm and was formed from pine, spruce and fir. The grafted polyethylene was an ethylene homopolymer having a density of 0.960 g/cm$^3$ and a melt index of 5.0 dg/min, that had been melt grafted with 0.9% of maleic anhydride, the grafted polymer having a melt index of about 2 dg/min.

In separate experiments, boric acid was added at levels of 1% based on sanderdust component (0.3% by weight of the composition), 1.5% by weight of the composition (5% based on sanderdust component) and 3.0% by weight of the composition (10% based on sanderdust component). The boric acid was applied by either (i) spraying an aqueous solution of boric acid on to the sanderdust prior to blending the sanderdust with molten polymer in an extruder, or (ii) dry blending boric acid powder with the sanderdust before blending the sanderdust with molten polymer in an extruder. The colour of the resultant samples was measured by the method described in Example IV. The results obtained are given in Table III.

TABLE III

| Sample No. | Application* Method | Boric Acid** (%) | Colour Index |
|---|---|---|---|
| 1 | — | 0 | 49.3 |
| 2 | Aqueous | 1.0 | 53.0 |
| 3 | Powder | 1.0 | 55.3 |
| 4 | Aqueous | 5.0 | 54.0 |
| 5 | Powder | 5.0 | 57.4 |
| 6 | Aqueous | 10.0 | 44.5 |
| 7 | Powder | 10.0 | 53.5 |

N.B. Sample 1 is a control i.e. boric acid was not added
*Method of application of boric acid, from aqueous solution or powder
**Amount based on the sanderdust The results show that the powder application method produces lighter coloured samples than the aqueous method at the same level of boric acid. The 5.0% boric acid level gave the lightest colour.

An odour survey was conducted using pairs of the samples of Table III. Nine testers were requested to rate one of two samples as having a stronger odour or that the two samples had an equal odour; the samples were assigned a rating of 2 if stronger and 1 each if of equal odour. Further details and the results obtained are given in Table IV.

TABLE IV

| Samples | Rating | Conclusion |
|---|---|---|
| 2 | 9) | The samples were of equal odour at 1.0% |
| 3 | 9) | boric acid level |
| 4 | 6) | Powder application produced a stronger |
| 5 | 12) | odour than solution application at 5.0% boric acid level |
| 6 | 15) | Solution application produces a stronger |
| 7 | 3) | odour than powder application at 10.0% boric acid level |
| 1 | 13) | 1.0% boric acid reduced odour level |
| 3 | 5) | |
| 1 | 14) | 5.0% boric acid reduced odour level |
| 5 | 4) | |
| 1 | 9) | 10.0% boric acid did not reduce odour |

TABLE IV-continued

| Samples | Rating | Conclusion |
|---|---|---|
| 7 | 9) | level |

The method of application of the boric acid has effects on both the colour of the samples and the odour of the samples.

I claim:

1. A mouldable filled composition consisting essentially of:
   (a) a polyethylene component comprising (i) 0–89.97%, by weight of the composition, of a homopolymer of ethylene or a copolymer of ethylene and at least one $C_4$–$C_{10}$ hydrocarbon alpha-olefin, or a mixture thereof, said homopolymer or copolymer having a density in the range of 0.89 to 0.97 g/cm$^3$ and a melt index in the range of 0.30 to 120 dg/min., and (ii) 0.01–89.98%, by weight of the composition, of a grafted polyethylene obtained by the grafting of a homopolymer of ethylene or copolymer of ethylene and at least one $C_4$–$C_{10}$ hydrocarbon alpha-olefin with a grafting monomer that is at least one of an ethylenically unsaturated aliphatic carboxylic acid or ethylenically unsaturated aliphatic carboxylic acid anhydride, said grafted polyethylene containing at least 0.01% of the grafting monomer;
   (b) 10–60% by weight of the composition, of a particulate lignocellulose material; and
   (c) 0.02–20%, by weight of the lignocellulose material, of a boron compound selected from the group consisting of boric acid and borax, and mixtures thereof.

2. The composition of claim 1 in which the grafting monomer is maleic acid or maleic anhydride.

3. The composition of claim 1 in which the boron compound is boric acid.

4. The composition of claim 1 in which the boron compound is borax.

5. The composition of claim 1 in which the boron compound is a mixture of boric acid and borax.

* * * * *